US012762693B2

(12) United States Patent
Wu et al.

(10) Patent No.: US 12,762,693 B2
(45) Date of Patent: Oct. 13, 2026

(54) SYSTEM AND METHOD FOR RESTORING PROJECTION DATA FROM CT/DBT SCANS WITH IMPROVED IMAGE QUALITY

(71) Applicant: GE Precision Healthcare LLC, Wauwatosa, WI (US)

(72) Inventors: Dufan Wu, Wakefield, MA (US); Giang-Chau Ngo, Viroflay (FR); Quanzheng Li, Belmont, MA (US)

(73) Assignee: GE Precision Healthcare LLC, Waukesha, WI (US)

( * ) Notice: Subject to any disclaimer, the term of this patent is extended or adjusted under 35 U.S.C. 154(b) by 910 days.

(21) Appl. No.: 17/977,468

(22) Filed: Oct. 31, 2022

(65) Prior Publication Data

US 2024/0144470 A1 May 2, 2024

(51) Int. Cl.
*G06T 7/00* (2017.01)
*G06T 12/10* (2026.01)
*G06T 12/30* (2026.01)

(52) U.S. Cl.
CPC ............ *G06T 7/0012* (2013.01); *G06T 12/10* (2026.01); *G06T 12/30* (2026.01);
(Continued)

(58) Field of Classification Search
CPC ... G06T 7/0012; G06T 11/005; G06T 11/008; G06T 2200/24; G06T 2207/10081;
(Continued)

(56) References Cited

U.S. PATENT DOCUMENTS

2007/0121779 A1* 5/2007 Nishide .................... G06T 12/10
378/4
2020/0279411 A1* 9/2020 Atria ...................... G06T 11/006
(Continued)

FOREIGN PATENT DOCUMENTS

CA 2797725 A1 * 11/2011 ............. G06T 12/20
CN 111080740 A * 4/2020 ........... G06T 11/008

OTHER PUBLICATIONS

Loli Piccolomini, Elena, and Elena Morotti. "A Model-Based Optimization Framework for Iterative Digital Breast Tomosynthesis Image Reconstruction." MDPI, Multidisciplinary Digital Publishing Institute, Feb. 13, 2021, www.mdpi.com/2313-433X/7/2/36 (Year: 2021).*

(Continued)

*Primary Examiner* — Nizar N Sivji
(74) *Attorney, Agent, or Firm* — Boyle Fredrickson, S.C.

(57) ABSTRACT

An image correction system and method takes an initial volume reconstructed from a number of projections obtained by the imaging system as the sole input to the image correction system. In a first step, the image correction system reconstructs a number of reconstructed or forward projections from the initial volume. In a second and optionally concurrent step, the image correction system forms a corrected volume by applying an artificial intelligence/deep learning/convolutional neural network model to the initial volume. In a third step, the image correction system employs the forward projections and the corrected volume as inputs to an iterative reconstruction process to achieve an optimized volume as an output from the image correction system. The use of the initial volume as the only input to the image correction system simplifies the computational processes of the image processing system while providing an optimized image having improved detail and image quality.

20 Claims, 4 Drawing Sheets

(52) U.S. Cl.
CPC ................................ *G06T 2200/24* (2013.01); *G06T 2207/10081* (2013.01); *G06T 2207/10116* (2013.01); *G06T 2207/30068* (2013.01); *G06T 2211/424* (2013.01)

(58) Field of Classification Search
CPC . G06T 2207/10116; G06T 2207/30068; G06T 2211/424; G06T 11/006; G06T 11/003
See application file for complete search history.

(56) References Cited

U.S. PATENT DOCUMENTS

| | | | | |
|---|---|---|---|---|
| 2021/0279847 | A1* | 9/2021 | Nett | A61B 6/5258 |
| 2023/0274473 | A1* | 8/2023 | Hua | G06T 12/10<br>382/131 |

OTHER PUBLICATIONS

CN 118266006 A (Year: 2021).*

* cited by examiner

SYSTEM AND METHOD FOR RESTORING PROJECTION DATA FROM CT/DBT SCANS WITH IMPROVED IMAGE QUALITY

FIELD OF THE DISCLOSURE

The present disclosure is related to the field of medical diagnostic imaging. and in particular tomographic imaging

BACKGROUND OF THE DISCLOSURE

Imaging technologies such as x-ray imaging allow for non-invasive acquisition of images of internal structures or features of a subject, such as a patient. Digital x-ray imaging systems produce digital data which can be reconstructed into radiographic images, such as in a computed tomosynthesis (CT) or digital breast tomosynthesis (DBT) imaging procedure. In digital x-ray imaging systems, radiation from a source is directed toward the subject. A portion of the radiation passes through the subject and impacts a detector. The detector includes an array of discrete picture elements or detector pixels and generates output signals based upon the quantity or intensity of the radiation impacting each pixel region. The output signals, views or projections are subsequently processed to generate an image that may be displayed for review. These images are used to identify and/or examine the internal structures and organs within a patient's body.

With regard to the generation of the images, as shown in FIG. 1, initially the digital x-ray imaging system obtains a number of projections of the subject, which in many situations includes a limited or sparse number of views, i.e., nine (9) projections or views due to limitations regarding the projection angles available around the subject, e.g., the breast in a digital breast tomosynthesis (DBT) imaging procedure. These views are reconstructed, such as through a filtered back projection (FBP) process, to create a volume from the projection data. The volume is subsequently run through an artificial intelligence, such as a trained deep learning (DL) network or convolutional neural network (CNN) to provide a correction to remove various artifacts, such as streaking artifacts, and improve image quality within the volume.

However, with regard to certain types of images, such as DBT images, the level of detail present within the images becomes reduced by the AI (e.g., DL or CNN) correction of the reconstructed volume and the iterative reconstruction process, i.e., oversmoothing of the volume output from the AI. This is due to the high level of resolution in the images that is subsequently removed by the AI in the correction and/or iterative reconstruction processes.

In order to overcome the oversmoothing of the corrected volume, an iterative reconstruction can be applied to the corrected volume. In this process, as shown in FIG. 1, the corrected volume is iteratively reconstructed in combination with the original projections or views in their form prior to the FBP process in a data consistency process to optimize the corrected volume and reduce the oversmoothing of the corrected volume introduced by the AI, and this improving the corrected volume for review and diagnostic purposes.

However, in certain situations the original projection images are not available to the AI for use in the iterative reconstruction process. As the projections/projections images are often only temporarily stored, either on the digital x-ray imaging device or in a separate electronic data storage device or location, when it is desired or necessary to implement the iterative reconstruction process, the original projections may not be available. This is particularly problematic when the initial volume created from the original projection images is corrupted for any of a number of reasons.

As a result, it is desirable to develop a digital x-ray image processing or correction system and method that is not dependent upon the use of the original projection images and can improve the level of detail in the corrected volume output by the AI to preserve the diagnostic information provided by the corrected volume, while also speeding up the processing time to obtain the corrected images.

SUMMARY OF THE DISCLOSURE

According to one aspect of an exemplary embodiment of the disclosure, a digital x-ray imaging system includes an image correction system employed for correcting and/or improving the detail and quality of images obtained by the imaging system. The image correction system takes an initial volume reconstructed from a number of projections/projection images or views obtained by the imaging system as the sole input to the image correction system. In a first step, the image correction system reconstructs a number of reconstructed or forward projections from the initial volume. In a second and optionally concurrent step, the image correction system forms a corrected volume by applying an artificial intelligence/deep learning/convolutional neural network model to the initial volume. In a third step, the image correction system employs the forward projections and the corrected volume as inputs to an iterative reconstruction process to achieve an optimized volume as an output from the image correction system. The use on the initial volume as the input to the image correction system greatly speeds up and simplifies the computational processes of the image processing system while additionally providing an optimized image having significantly improved detail and image quality as compared to prior art image correction systems and processes employing original projections/projection images or views as inputs.

According to another exemplary embodiment of the disclosure, a method for optimizing an image obtained using a digital imaging x-ray system includes the steps of providing a digital x-ray imaging system having an x-ray source, an x-ray detector alignable with the x-ray source, an image processing system operably connected to the x-ray source and x-ray detector to generate x-ray image data, the image processing system including a processing unit for processing the x-ray image data from the x-ray detector to form projections and other images from the x-ray image data, and non-transitory memory operably connected to the processing unit and storing instructions for operation of an image correction system, a display operably connected to the image processing system for presenting information to a user, and a user interface operably connected to the image processing system to enable user input to the image processing system, obtaining a number of original projections of a subject, reconstructing an initial volume from the original projections, forming a number of forward projections from the initial volume within the image correction system, correcting the initial volume to form corrected volume within the image correction system, and optimizing the corrected volume in an iterative reconstruction process within the image correction system using the forward projections and the corrected volume to form an optimized volume.

According to still another aspect of an exemplary embodiment of the present disclosure, a digital x-ray imaging system includes an x-ray source, an x-ray detector alignable with the x-ray source, an image processing system operably connected to the x-ray source and x-ray detector to generate x-ray image data, the image processing system including a processing unit for processing the x-ray image data from the x-ray detector to form projections and other images from the x-ray image data, non-transitory memory operably connected to the processing unit and storing instructions for operation of an image correction system, a display operably connected to the image processing system for presenting information to a user, and a user interface operably connected to the image processing system to enable user input to the image processing system, wherein the processing unit and non-transitory memory for the image processing system is configured to form a number of forward projections from an initial volume reconstructed from a number of original projections obtained by the digital x-ray imaging system, to correct the initial volume to form a corrected volume and to optimize the corrected volume in an iterative reconstruction process using the forward projections and the corrected volume to form an optimized volume.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

Figure 1:
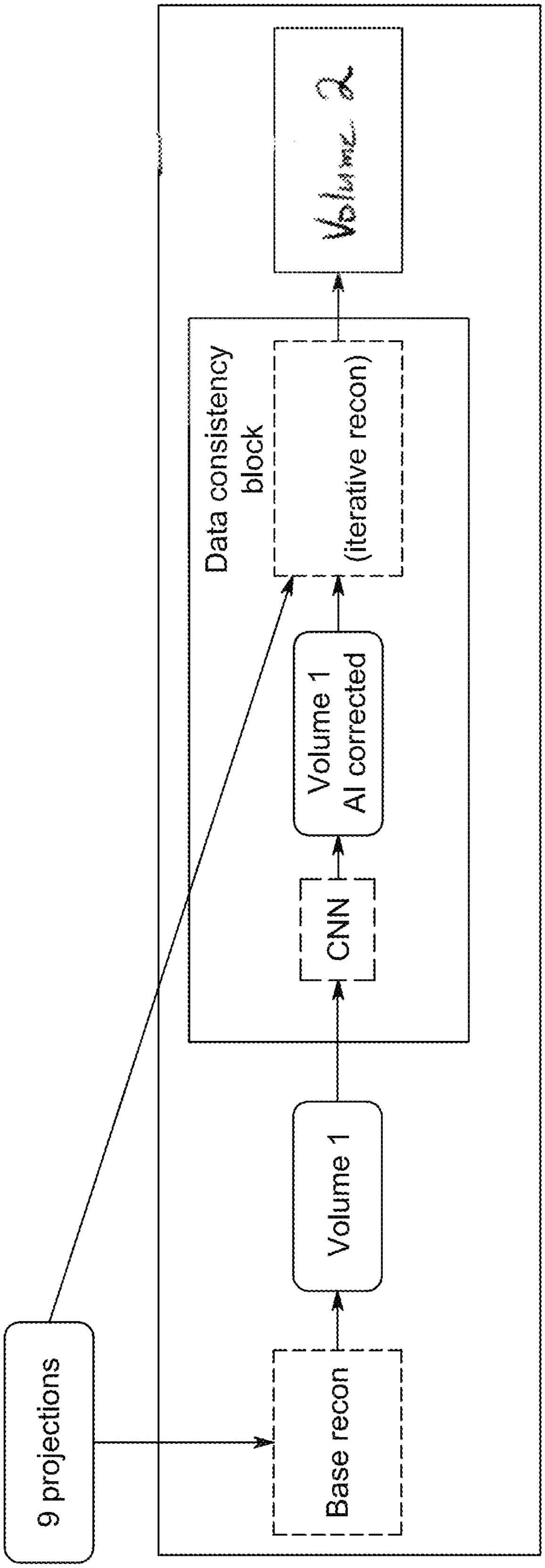
Prior Art FIG. 1
FIG. 1 is a block schematic view of a prior art image volume reconstruction process.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The following description relates to various embodiments of x-ray imaging. In particular, systems and methods are provided for parametric noise reduction in x-ray imaging. An x-ray imaging system, such as the digital imaging system depicted in FIGS. 2 and 3, and as disclosed in U.S. Pat. No. 11,288,775, entitled Methods And Systems For Parametric Noise Modulation In X-Ray Imaging (the '775 Patent), the entirety of which is hereby expressly incorporated herein by reference for all purposes, may use an x-ray source and an x-ray detector to acquire a number of angularly displaced radiographic images of a subject, such as a patient or a portion thereof, e.g., a breast. The image or projection data obtained by the x-ray detector at each angular position of the x-ray source and/or x-ray detector is provided to an image processing system and method which is utilized to create or reconstruct a volume of the imaged patient or portion thereof. Subsequently, an artificial intelligence (AI), such as a deep learning (DL) network or convolutional neural network (CNN), is employed to correct the volume with respect to any artifacts, such as streaking artifacts, detected by the AI within the reconstructed volume, as shown in FIG. 4. In the correction process, the reconstructed volume is forwarded to the AI to form the corrected volume. The reconstructed volume is also utilized in a process for the generation of the forward projection images from the reconstructed image. The forward projection and the corrected volume are then employed in an iterative reconstruction process to obtain the final corrected volume for viewing and use in diagnostic procedures.

While the systems and methods provided herein are described with regard to x-ray imaging techniques, it should be appreciated that the techniques provided herein may also be applied to various imaging modalities, including various modalities of x-ray imaging (e.g., single energy, dual energy, tomography, image pasting, fluoroscopy, mammography, and so on), computed tomography (CT), and positron emission tomography.

Figure 2:
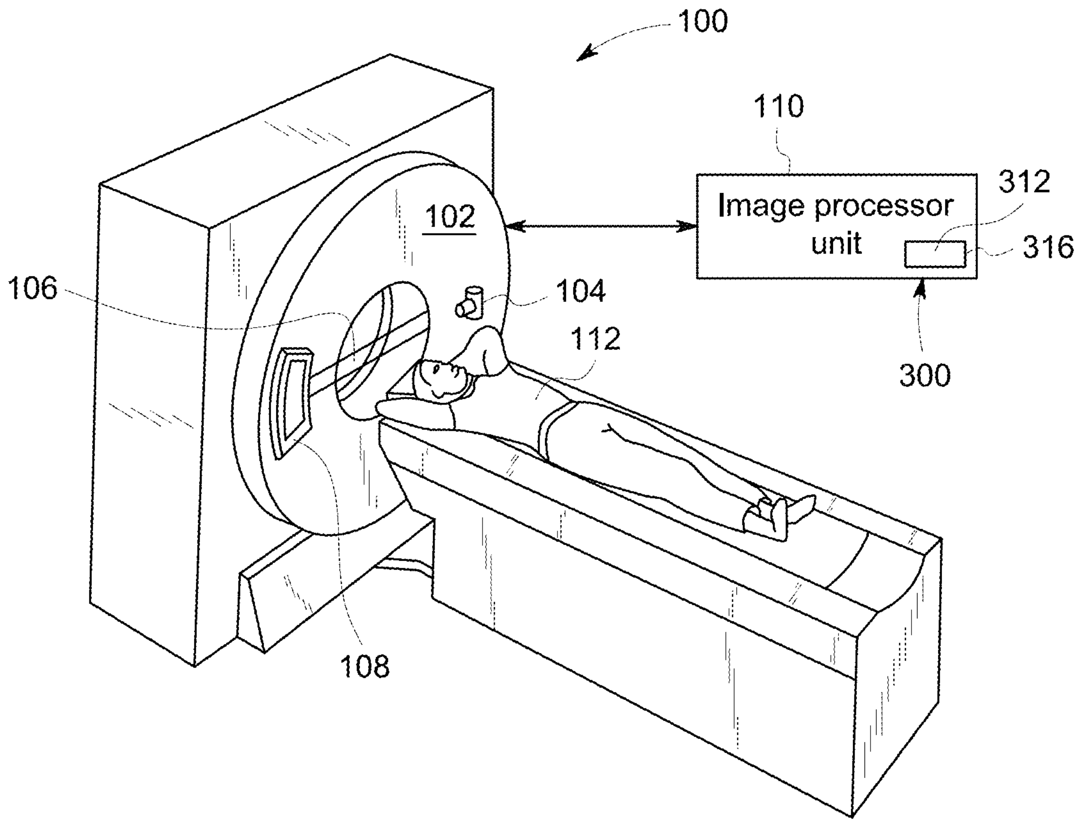
FIG. 2 is a pictorial view of a digital x-ray imaging system, according to an embodiment.

FIG. 2 illustrates an exemplary digital x-ray imaging system and/or CT system 100 configured for CT imaging. Particularly, the CT system 100 is configured to image a subject 112 such as a patient, or portion thereof, such as a breast, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 for use in imaging the subject 112. Specifically, the x-ray source 104 is configured to project the x-rays 106 towards a detector array 108 positioned on the opposite side of the gantry 102. Although FIG. 2 depicts only a single x-ray source 104, in certain embodiments, multiple x-ray radiation sources and detectors may be employed to project a plurality of x-rays 106 for acquiring projection data at different energy levels corresponding to the patient.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, a radiation source projects a cone-shaped beam which is collimated to lie within an X-Y-Z plane of a Cartesian coordinate system and generally referred to as an "imaging plane." The radiation beam passes through an object being imaged, such as the patient or subject 112. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detector elements are acquired separately to produce a transmission profile.

In some CT systems, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, digital breast tomography (DBT), positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein, the term "image" broadly refers to both viewable images and data representing a viewable image. However, many embodiments generate (or are configured to generate) at least one viewable image.

Figure 3:
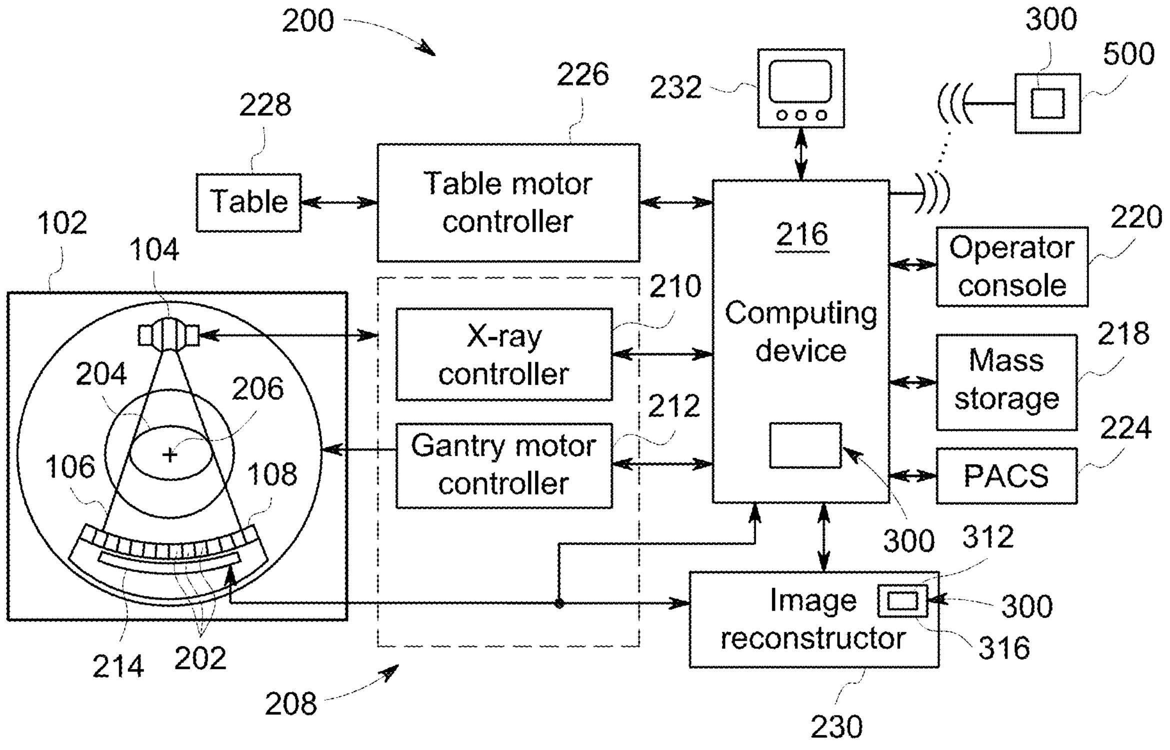
FIG. 3 shows a block schematic diagram of an exemplary digital x-ray imaging system, according to an embodiment.
Figure 4:
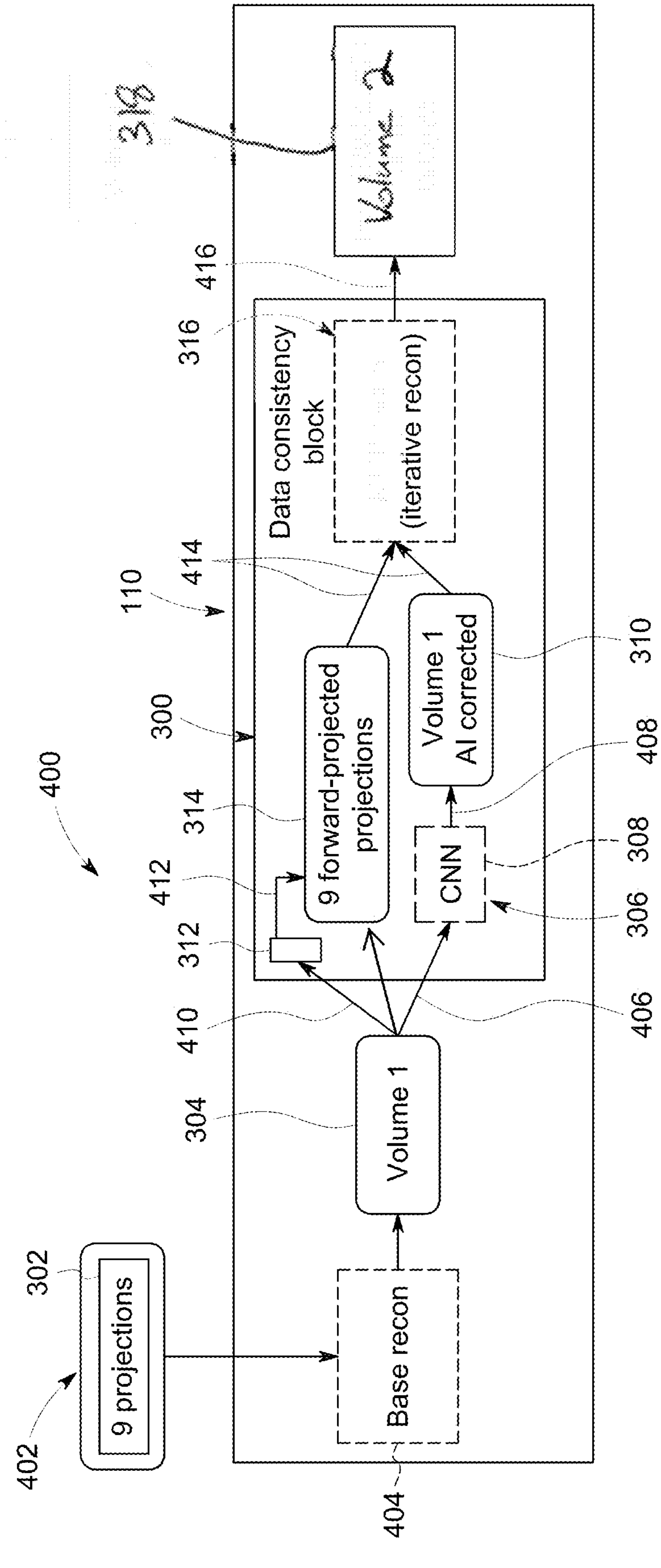
FIG. 4 is a block schematic diagram of an exemplary image correction system and process according to an exemplary embodiment of the disclosure.

FIG. 3 illustrates an exemplary digital x-ray imaging system 200 similar to the CT system 100 of FIG. 2. In accordance with aspects of the present disclosure, the imaging system 200 is configured for imaging a subject 204, which can be the subject 112 of FIG. 2, or portion thereof, such as a breast in a digital breast tomosynthesis (DBT) imaging procedure. In one embodiment, the imaging system 200 includes the detector array 108 (see FIG. 2). The detector array 108 further includes a plurality of detector elements 202 that together sense the x-ray beams 106 (see FIG. 2) that pass through the subject 204 to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, non-transitory memory and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 3 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology depathnent information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 228 which may be a motorized table. Specifically, the table motor controller 226 may move the table 228 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 3 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various systems, methods and processes (such as the system 300 and method 400 described below with reference to FIG. 4) described further herein may be stored as executable instructions in non-transitory memory on a computing device (or controller) in imaging system 100, 200. In one embodiment, image reconstructor 230 may include such executable instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

Referring to FIGS. 3 and 4, an exemplary embodiment of the system 100,200 includes an image correction system 300 and associated method 400 employed as a part of the image processor unit 110, the computing device 216 and/or the image reconstructor 230, or alternatively within a remote computing system 500 that is operably connected to the imaging system 100,200.

In the image correction system 300 and associated method 400, initially in step 402 the digital imaging system 100,200 is operated to obtain a number of views or projections 302 of the subject being imaged. The set of projections 302 are transmitted to the image processor unit 110 which in step 404 performs a base reconstruction on the projections 302, such as a filtered back projection (FBP), to obtain an initial volume 304.

In step 406, the initial volume 304 is transmitted to the image correction system 300. In particular, the initial volume 304 is transmitted to an artificial intelligence (AI) 306 forming a component of the image correction system 300 and which can be stored as executable instructions in non-transitory memory 218 on or connected to a computing device (or controller) 216 in imaging system 100, 200. In certain exemplary embodiments of the disclosure, the AI 306 can be formed as one or more of a trained deep learning (DL) model, a convolutional neural network (CNN) model, a linear regression model, and a non-linear regression model, among other suitable AI models. In one exemplary embodiment of the image correction system 300, the AI 306 is formed as a CNN 308 that is trained to detect and correct for artifacts detected by the CNN 308 within the initial volume 304 supplied to the CNN 308 in order to output a corrected volume 310 in step 408.

In conjunction with the transmission of the initial volume 304 in step 406, in step 410 the initial volume 304 in one exemplary embodiment is also transmitted to a projection restoration module 312 formed as a part of the image correction system 300 and which can be stored as executable instructions in non-transitory memory 218 on or connected to a computing device (or controller) 216 in imaging system 100, 200. The projection restoration module 312 receives the initial volume 304 and in step 412 operates to generate a set of restored or forward projection images 314 from the initial volume 304 that match the initial volume 304 and constitute approximations or simulations of the original projections 302 used to form the initial volume 304. To create the forward projections 314, in the situation where the initial volume 304 was reconstructed with iterative methods, the forward projections 314 can be formed from the initial volume 304 by the projection restoration module 312 with the same geometry and/or angular positions relative to the subject 112 and/or the initial volume 304 as the original projections 302, such as the case for digital breast tomosynthesis (DBT). The forward projections 314 can also be formed in other suitable processes. With the use of the forward projections 314, the iterative reconstruction module 316 (to be described) only needs to digest the images/forward projections 314 but not the projection data, for use in any subsequent process, such as within the iterative reconstruction module 316, any original projection 302 needs additional artifact corrections for metal artifacts and breast skins, among others, whereas using a forward projection 314 does not as artifacts have already been addressed and/or removed in the creation/reconstruction of the initial volume 304 from which the forward projections 314 are formed, and there is minimal detail loss using a forward projection 314 as compared to using an original projection 302.

Alternatively, in the situations where the original projections/projection images 302 were reconstructed into the initial volume 304 with a filtered backprojection (FBP) process, the forward projections 314 will be formed by the projection restoration module 312 in an iterative way so that the FBP data for the forward projections 314 will be the same as that of the initial volume 304. As an example of a suitable iterative process, the projection data y is restored by iteratively solving the optimization problem $y^*=\arg_{min}\|FBP(y)-x\|$, where FBP(y) can be written in a matrix form, i.e., FBP(y)=Ay, where A is a matrix. The optimization problem is solved by initializing y with the forward projection from x, and iteratively reduce the object function via optimization algorithms such as but not restricted to steepest descend. In addition to being used to reduce the oversmoothing in any AI-processed images, the forward projections 314 can also be provided to any iterative reconstruction algorithms, e.g., advanced IR with TV minimization, for use as or in place of real projections. In this way, powerful iterative reconstruction algorithms can be used to improve the image quality even if the original projection data is missing. Further, in either situation, the projection restoration module 312 does not require the actual projections/projection data 302 for the creation of the forward projections 314, but only the reconstructed initial volume 304.

Continuing within the image correction system 300, the forward projections 314 output by the projection restoration module 312 and the corrected volume 310 output by the CNN 308 are then each sent in step 414 to an iterative reconstruction module 316 forming another component of the image correction system 300 and which can be stored as executable instructions in non-transitory memory 218 on or connected to a computing device (or controller) 216 in imaging system 100, 200. The iterative reconstruction module 316 operates to apply an unregularized or unconstrained iterative reconstruction process where the restored, forward projection 314 is used as the projection, and the DL-image/corrected volume 310 is used as the initialization to the iterative reconstruction process to create an optimized volume 318 as the output from the image correction system 300 in step 416. While the number of iterations performed by the iterative reconstruction module 316 can be determined to obtain the desired correction to for the optimized volume 318, in an exemplary embodiment the module 316 can employ a series of up to (10) iterations to achieve a desired correction for the optimized volume 318.

Figure 5D:
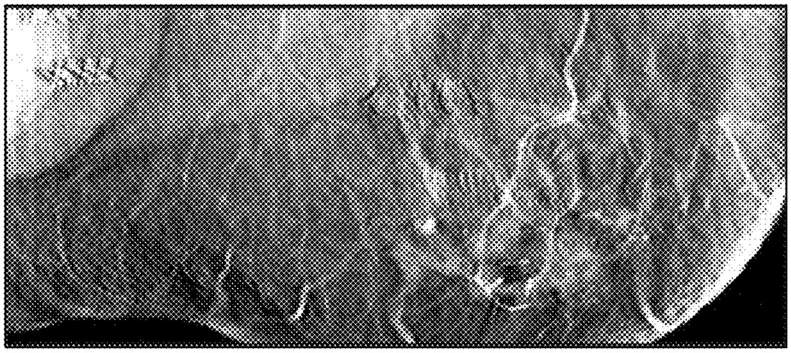
FIGS. 5A-5D are comparative images of corrected volumes obtained from the image volume reconstruction process, a corrected volume from a prior art iterative reconstruction process and a corrected volume from an iterative reconstruction process according to an exemplary embodiment of the disclosure.
Figure 5C:
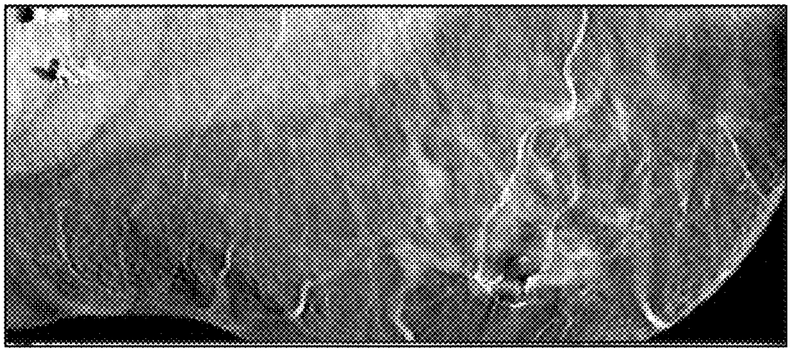
Figure 5B:
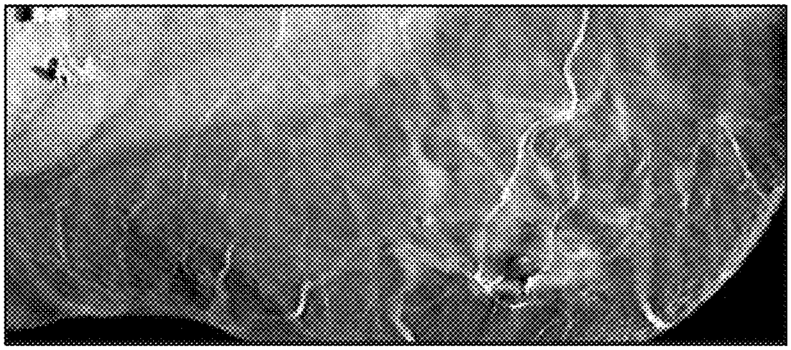
Figure 5A:
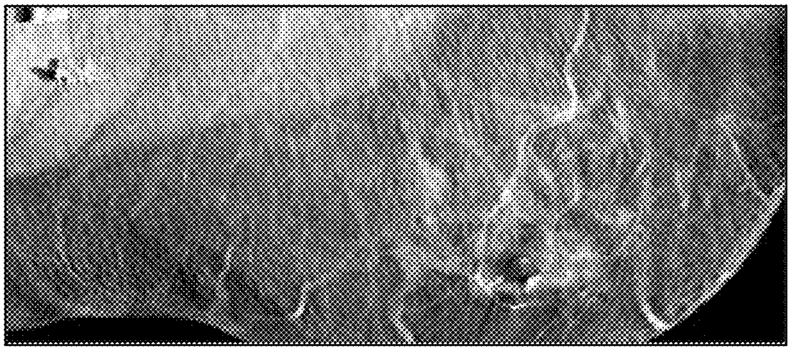

Looking now at FIGS. 5A-5D, representations of the reconstructed initial volume 304 (FIG. 5A), the AI corrected volume 310 (FIG. 5B), the optimized volume 318 (FIG. 5C) and an exemplary volume (FIG. 5D) output from the prior art process of FIG. 1. As shown in FIGS. 5A-5D, the detail provided in the initial reconstructed volume of FIG. 5A is smoothed in the initial AI corrected volume 310 of FIG. 5B. In FIG. 5C, the prior art process of re-using the original projections in the iterative reconstruction brings back artifacts into the exemplary volume from the prior art process of FIG. 1. However, by employing the forward projections 314 in the method 400 in the iterative reconstruction module 318, the detail of the optimized volume 318 in FIG. 5D is improved from the corrected volume 310 while negating the re-introduction of artifacts from the original projections 302.

Further, with respect to the operational benefits of the image correction system 300, as the image correction system 300 takes as an input only the initial volume 304, the computational needs for the creation of the forward projections 314 and the corrected volume 310 is significantly reduced as the raw projection data is not employed within the operation of the image correction system 300. The lack of the raw image or projection data as a requirement for the operation of the image correction system 300 significantly speeds up the operation of the image correction system 300 relative to prior art systems, as there is no need for processing the raw projection data and/or performing additional processing on the raw projection data, such as metal reduction or other artifacts removal processing. In addition, should the raw projection data be corrupted or unavailable, e.g., the raw projection data was not stored, the image correction system 300 can still operate with only the initial volume 304.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A method for optimizing an image obtained using a digital imaging x-ray system, the method comprising the steps of:

a. providing a digital x-ray imaging system comprising:
  i. an x-ray source;
  ii. an x-ray detector alignable with the x-ray source;
  iii. an image processing system operably connected to the x-ray source and x-ray detector to generate x-ray image data, the image processing system including a processing unit for processing the x-ray image data from the x-ray detector to form projections and other images from the x-ray image data, and non-transitory memory operably connected to the processing unit and storing instructions for operation of an image correction system;
  iv. a display operably connected to the image processing system for presenting information to a user; and
  v. a user interface operably connected to the image processing system to enable user input to the image processing system;
b. obtaining a number of original projections of a subject;
c. reconstructing an initial volume from the original projections;
d. forming a number of forward projections from the initial volume within the image correction system;
e. correcting the initial volume by detecting and correcting artefacts within the initial volume with an artificial intelligence to form a corrected volume within the image correction system; and
f. optimizing the corrected volume in an iterative reconstruction process within the image correction system using the forward projections and the corrected volume to form an optimized volume.

2. The method of claim 1, wherein the step of forming the forward projections comprises forming a number of forward projections corresponding to each of the original projections.

3. The method of claim 2, wherein the step of forming the number of forward projections corresponding to each of the original projections comprises forming each forward projection with a geometry within the initial volume corresponding to one of the original projections.

4. The method of claim 3, wherein the step of forming the number of forward projections corresponding to each of the original projections comprises iteratively forming the forward projection from the initial volume.

5. The method of claim 1, wherein the step of optimizing the corrected volume in an iterative reconstruction process does not include utilization of the original projections.

6. The method of claim 1, wherein the step of optimizing the corrected volume in the iterative reconstruction process consists of using the forward projections and the corrected volume in the iterative reconstruction process to form an optimized volume.

7. The method of claim 1, wherein the number of forward projections is used as a projection within the iterative reconstruction process, and the corrected volume is used as an initialization within the iterative reconstruction process.

8. The method of claim 7, wherein the iterative reconstruction process is an unconstrained iterative reconstruction process.

9. The method of claim 7, wherein the iterative reconstruction process includes 10 or fewer iterations.

10. The method of claim 1, wherein the digital x-ray imaging system is selected from a computed tomography system, and digital breast tomography system.

11. The method of claim 1, wherein further comprising the step of providing an input consisting of the initial volume to the image correction system prior to the step of forming a number of forward projections from the initial volume.

12. A digital x-ray imaging system comprising:
a. an x-ray source;
b. an x-ray detector alignable with the x-ray source;
c. an image processing system operably connected to the x-ray source and x-ray detector to generate x-ray image data, the image processing system including a processing unit for processing the x-ray image data from the x-ray detector to form projections and other images from the x-ray image data;
d. non-transitory memory operably connected to the processing unit and storing instructions for operation of an image correction system,
e. a display operably connected to the image processing system for presenting information to a user, and
f. a user interface operably connected to the image processing system to enable user input to the image processing system;
wherein the processing unit and non-transitory memory for the image processing system is configured to form a number of forward projections from an initial volume reconstructed from a number of original projections obtained by the digital x-ray imaging system, to correct the initial volume by detecting and correcting artefacts within the initial volume with an artificial intelligence to form a corrected volume and to optimize the corrected volume in an iterative reconstruction process using the forward projections and the corrected volume to form an optimized volume.

13. The digital x-ray imaging system of claim 12, wherein the processing unit and non-transitory memory for the image correction system is provided an input consisting of the initial reconstructed volume.

14. The digital x-ray imaging system of claim 12, wherein the processing unit and non-transitory memory for the image correction system is configured to form a number of forward projections corresponding to the original projections used to form the initial volume.

15. The digital x-ray imaging system of claim 14, wherein the number of forward projections have a geometry within the initial volume corresponding to one of the original projections.

16. The digital x-ray imaging system of claim 14, wherein the processing unit and non-transitory memory for the image correction system is configured to optimize the corrected volume in the iterative reconstruction process to form an optimized volume utilizing only the forward projections and the corrected volume.

17. The digital x-ray imaging system of claim 15, wherein the number of forward projections is used as a projection within the iterative reconstruction process, and the corrected volume is used as an initialization within the iterative reconstruction process.

18. The digital x-ray imaging system of claim 16, wherein the iterative reconstruction process is an unconstrained iterative reconstruction process.

19. The digital x-ray imaging system of claim 16, wherein the iterative reconstruction process includes 10 or fewer iterations.

20. The digital x-ray imaging system of claim 12, wherein the digital x-ray imaging system is selected from a computed tomography system, and digital breast tomography system.

* * * * *